United States Patent

[11] 3,577,162

[72] Inventors Hermann Gaehwiler;
Kurt Schoen, Zurich, Switzerland
[21] Appl. No. 809,332
[22] Filed Mar. 21, 1969
[45] Patented May 4, 1971
[73] Assignee Contraves AG.
Zurich, Switzerland
[32] Priority Apr. 19, 1968
[33] Switzerland
[31] 5869/68

[54] AUTOMATIC COUNTING SYSTEM FOR FLUID SUSPENDED PARTICLE
4 Claims, 4 Drawing Figs.

[52] U.S. Cl.................................................. 250/218,
250/222, 324/71
[51] Int. Cl........................................................ G01n 21/26
[50] Field of Search.......................................... 250/218,
222 (M); 73/113, 32, 432 (PC); 356/40, 39, 196,
197; 324/71 (PC), 710 (PC); 235/92—30 (PC)

[56] References Cited
UNITED STATES PATENTS

| | | | |
|---|---|---|---|
| 2,875,666 | 3/1959 | Parker et al. .................. | 250/222 |
| 2,927,461 | 3/1960 | Welch et al. .................. | 73/113 |
| 3,000,207 | 9/1961 | Goffe ............................ | 73/113 |
| 3,242,794 | 3/1966 | Crane............................ | 250/218 |

*Primary Examiner*—Walter Stolwein
*Attorney*—Werner W. Kleeman

ABSTRACT: A novel counting system for counting particles suspended in a fluid medium is disclosed. The counting system comprises electrode means for sensing the presence of particles in a fluid means and producing a signal representative thereof; conveying means for conveying the fluid medium through said electrode means into a measuring tube; an upper and a lower spaced apart fluid level sensing means disposed at the measuring tube; and counter means coupled with said sensing means and said electrode means for counting said signals, said counter means being turned on by said lower sensing means when the fluid reaches the lower level in the measuring tube, and being turned off by said upper sensing means when the fluid reaches the upper level in the measuring tube.

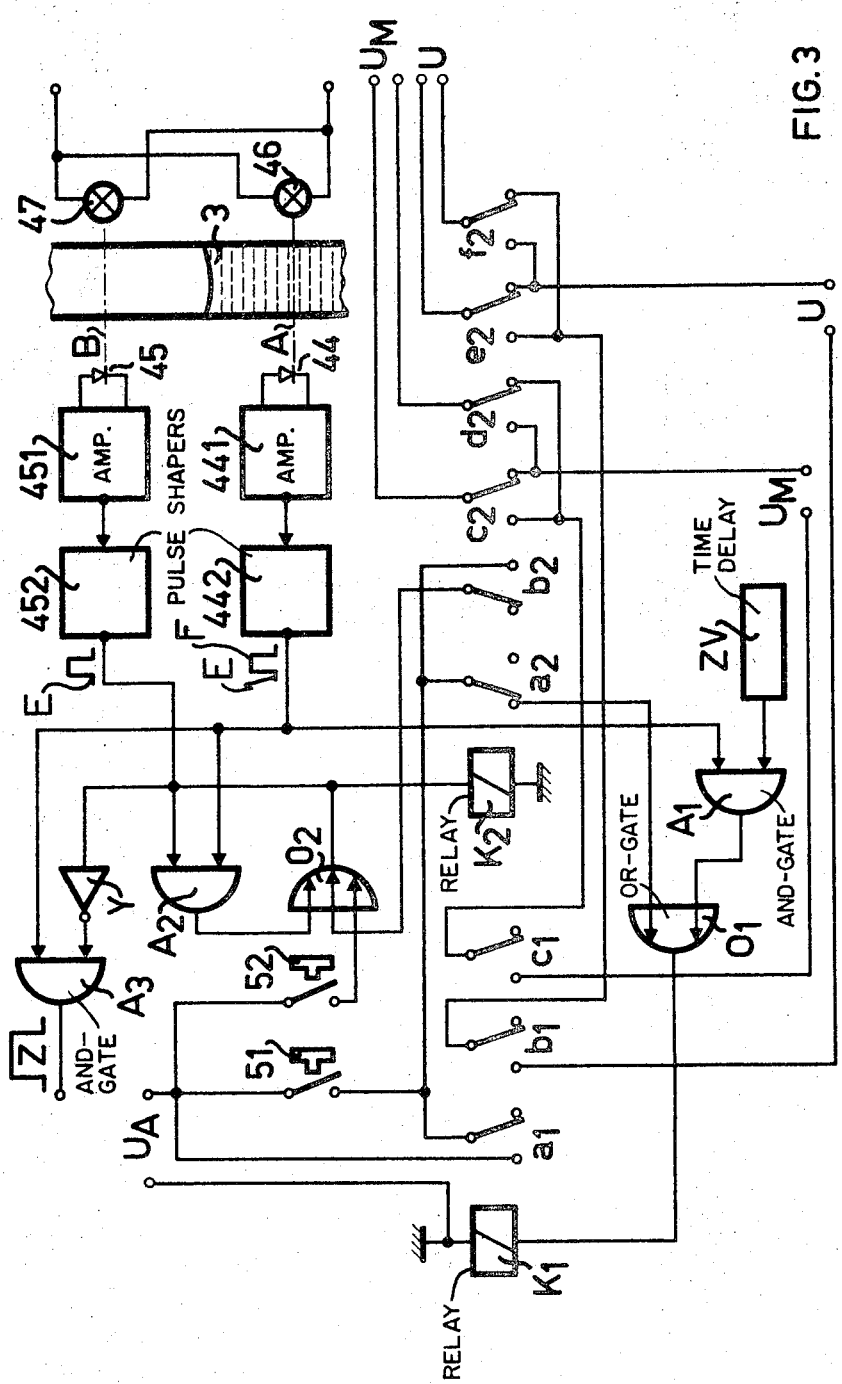

3,577,162

AUTOMATIC COUNTING SYSTEM FOR FLUID SUSPENDED PARTICLE

BACKGROUND OF THE INVENTION

The present invention relates to an improved counting apparatus for counting particles suspended in a fluid medium, wherein a respective quantity of the fluid medium which is to be measured together with the suspended particles is delivered by a conveying system from a container of the like through an electrical resistance measuring path. Each particle upon passing through the electrical resistance measuring path causes a change of the measuring path resistance which can be determined at a counting mechanism.

It has already been proposed in the art to measure the quantity of fluid medium by means of a mercury siphon system in which mercury under the influence of the force of gravity in a vessel drops along a volumetrically calibrated path. Particle counters of this type are frequently used for biological and medical tests, for instance for the routine counting of blood cells or other cells. These mercury siphon systems are cumbersome to operate, and upon rupture of the system the danger exists that thereafter nocuous mercury vapors occur which originate from mercury residues which have not been removed. If the mercury siphon system is additionally employed for switching-in and switching-out the countermechanism then the switching accuracy can be impaired through the presence of contaminations or resulting mercury oxide.

SUMMARY OF THE INVENTION

Accordingly, it is a primary object of the present invention to provide an improved automatic particle counting system which effectively overcomes the aforementioned drawbacks existing in the previously considered prior art constructions.

Another more specific object of the present invention relates to an improved automatic particle counting system for the accurate measurement of particles suspending in a fluid medium without the existence of the aforementioned dangers which might occur with the prior-art constructions noted above.

Still another extremely significant object of the present invention relates to a particle counting system of the mentioned type which provides for an exact measuring of the quantity of fluid medium flowing through the electrical resistance measuring path without having to employ the cumbersome and complicated mercury siphon system or a mercury switching system.

Yet a further equally significant object of the present invention relates to an improved particle counting system which automatically counts particles suspended in a fluid medium in a completely accurate and reliable manner, wherein the system itself is relatively inexpensive to manufacture, easy to operate, and not readily subject to breakdown.

Now, in order to implement these and still further objects of the invention, which will become more readily apparent as the description proceeds, the inventive automatic particle counting system is generally manifested by the features that in order to measure the fluid medium quantity flowing through the electrical resistance measuring path, there are provided two photoelectric scanning devices which are arranged in superimposed fashion at a predetermined distance from one another at a volumetrically calibrated measuring tube. These photoelectric scanning devices utilize the sudden changes in intensity of the light impinging upon the corresponding photocell due to changes of the refractive and reflective conditions during passage of the fluid medium in order to switch-in and switch-out countermechanism mechanism.

BRIEF DESCRIPTION OF THE DRAWINGS

The invention will be better understood and objects other than those set forth above, will become apparent, when consideration is given to the following detailed description thereof. Such description makes reference to the annexed drawings wherein:

FIG. 3 is a block diagram of the electronic circuitry employed for the automatic sequence of operating steps or operational program of the particle counting apparatus of FIG. 1.

DESCRIPTION OF THE PREFERRED EMBODIMENT

Figure 1:
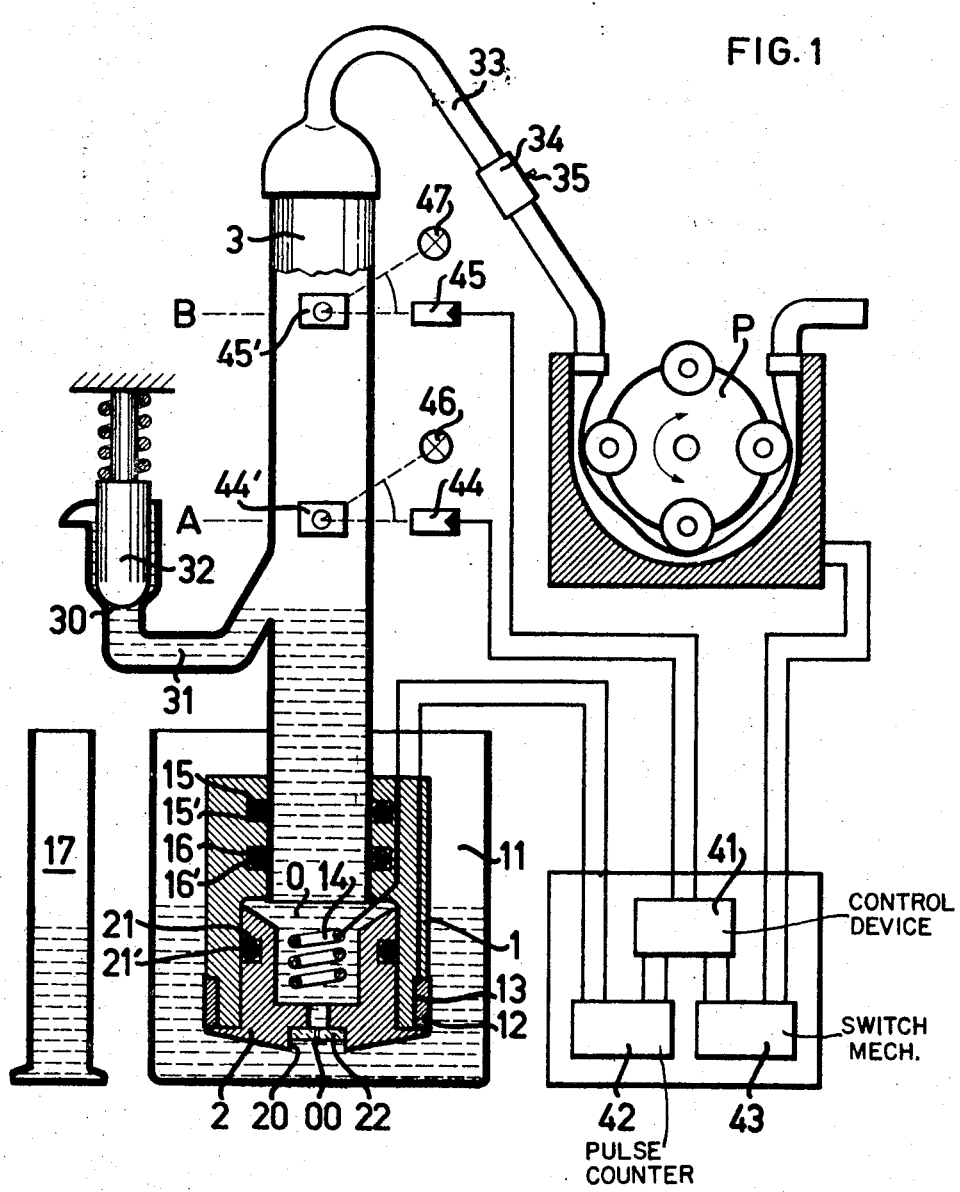
FIG. 1 is a schematic sectional view of an embodiment of particle counting apparatus.

Describing now the drawings, in FIG. 1 there is shown by way of example an embodiment of inventive particle counting apparatus essentially in sectional view. Such will be seen to comprise a measuring head embodying an electrode support member 1 equipped with a substantially ring-shaped or annular outer electrode 12 situated in an appropriately configured groove or recess 13. Furthermore, a substantially spiral-shaped inner electrode 14 is arranged in the bore 0 of the electrode support 1. The outer electrode 12 and the inner electrode 14 are formed, for instance, from platinum or a platinum alloy. Furthermore, at the wall of the bore 0 of the electrode support 1 there are additionally provided the peripheral grooves 15 and 16 serving to receive both the sealing O-rings 15' and 16', respectively.

A measuring path support member 2 also forming part of the measuring heads it detachably and exchangeably fitted into the bore 0 of the electrode support 1. The measuring pat support member 2 is provided at its outer wall with a peripheral groove 21 serving to receive the sealing O-ring member 21'. In a bore 20 of the measuring path support member 2 there is mounted a crystal, here shown as a ruby 22, which, in turn, is provided with an orifice or bore 00 which forms the calibrated resistance measuring path. In order to count particles of different sizes, it is possible to readily exchange the measuring path support member 2. Also, it might here be mentioned that the measuring path support member 2 and the electrode support 1 are advantageously formed of an extensively chemically inert material, such as, for instance, TEFLON or ceramics.

Apart from the foregoing structure, the particle counting apparatus further embodies a glass tube 3 which is inserted with one end into the bore 0 of the electrode support 1. During operation of the system, a pumping unit here shown as a hose pump P conveys fluid medium from a container 11 through the bore 00 of the ruby 22 into the glass tube 3. As best observed with reference to FIG. 1, a leakage insert 34 provided with the drain or bleed 35 can be connected to the hose member 33 of the hose pump P. The drain or bleed 35 serves to balance the negative pressure prevailing in the glass tube 3 and in the hose member 33 when the pump P is switched-off. On the other hand, by selecting the size of the bleed 35, it is possible to influence the delivery capacity of the pump P.

As soon as the fluid column has passed through the level A, then pulse countermechanism 42 is switched in through the agency of a control device 41 which, for instance, utilizes as its signal transmitter, a photoelectric cell 44 provided with a lamp 46 and a shutter or diaphragm 44'. Pulse counter countermechanism then counts the particles flowing through the measuring path defined by the bore 00 of the ruby 22. A second signal transmitter, again the the form of the photoelectric cell 45 provided with the light source or lamp 47 and a shutter or diaphragm 45', switches off the pulse countermechanism 42 as soon as the liquid column passes through the level B. At the same time, a switching device 43 changes the direction of rotation of the pump P and therefore its pumping action. The fluid medium located in the glass tube 3 is ejected via the discharge tube 31 and flows into the collecting vessel or container 17. The entire described counting operation is automatic as such will become more fully apparent as the description proceeds. The opening 30 of the discharge tube 31 is tightly sealed by a pressed-on, for example, spring-biased, sealing member 32, so that only fluid is discharged, and no gas or fluid can be pumped in. The fluid medium discharged through the discharge tube 31 could also be directly delivered back into the supply container or vessel 11, if desired.

The preceding description of the disclosed embodiment of particle counting apparatus has been given in order to provide for a better understanding of the invention, even though the primary subject matter of this disclosure is directed to the scanning or readout mechanism and its associated electronic circuitry for performing the automatic counting operation. While the foregoing description is believed to be adequate for those varied in the art to readily understand the inventive concepts herein involved, reference may be further made to the commonly assigned, copending U.S. application, Ser. No. 807,853, filed Mar. 17, 1969, and entitled: PARTICLE COUNTING APPARATUS, wherein there is disclosed in even greater detail the physical construction of the herein illustrated as well as other embodiments of particle counting apparatus with which the automatic counting system of the invention can be readily employed.

Figure 2:
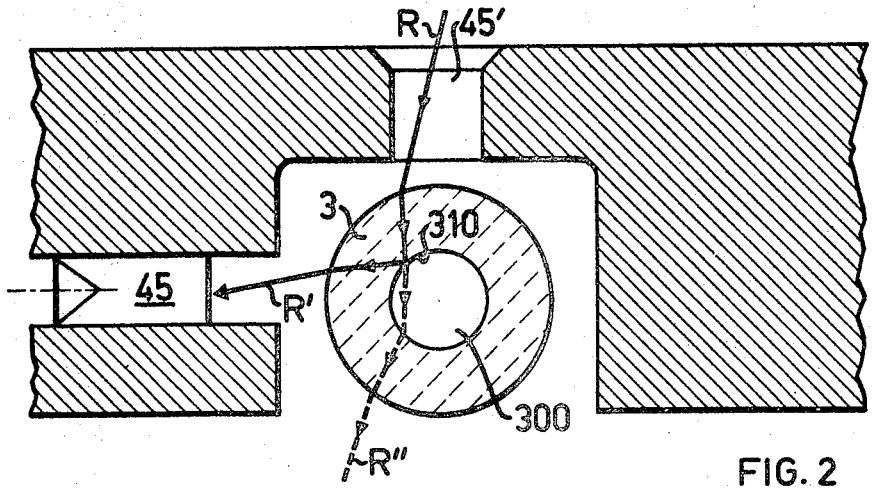
FIG. 2 is an enlarged fragmentary view of a portion of the particle counting apparatus depicted in FIG. 1, and in particular illustrating the mode of operation of the photoelectric scanning or reading device at the fluid level B of FIG. 1.

Considering now FIG. 2, there is shown a photoelectric scanning or readout device in fragmentary sectional view and its mode of operation at the fluid level B of FIG. 1. It has been assumed that no fluid medium is present at the level B within the glass tube 3. A light ray R, which impinges upon the glass tube 3 through the apertured diaphragm or shutter 45', cannot enter the internal compartment 300 of the glass tube 3 because of the total reflection conditions $$\Phi_1 = \frac{1}{n_1}$$

(wherein $n_1 =$ refractive index glass-air; and $\Phi_1 =$ critical angle of incidence with respect to the perpendicular). Rather, this light ray R is reflected at the inner cylindrical wall surface 310 and travels along the path R' to impinge upon the photoelectric cell 45. The path of the light ray R–R' for this case is shown in FIG. 2 with a solid line.

On the other hand, if the fluid medium reaches the level B, then the total reflection conditions $$\Phi_2 = \frac{1}{n_2}$$

(wherein $n_2 =$ refractive index glass-fluid and $\Phi_2 =$ critical angle of incidence with respect to the perpendicular) at the cylindrical surface 310 are such that the light ray R moves along the path R" into the internal compartment 300 and from this location again travels through the glass wall of the tube 3 towards the outside. In this case, the light ray RR" no longer impinges upon the photocell 45. The photocell 45 must not be arranged such that its axis of symmetry is directed towards the center of the glass tube 3. If the ratio of the outer diameter to the diameter of the hollow compartment of the glass tube 3 is chosen so that it amounts to approximately 3:1 and if there is selected a glass with a refractive index $n=1.4$ then, by utilizing the described technique, it is possible to obtain without difficulty light intensity variations which bring about more than a 50-fold change of the signal of the photoelectric cell 45.

FIG. 3 shows in block diagram a preferred form of electric circuitry for the inventive control device 41 of FIG. 1 for carrying out the automatic operation of the sequential steps of the program. The system functions with the operating voltage $U_A$. If the start button 51 is depressed, then the relay $K_1$ is energized via the contact $a_2$ and assumes a self-holding action via the contacts $a_1$, $a^2$ and the OR-gate $0_1$. Consequently, the following functions are triggered: The drive motor of the delivery or conveying pump P (FIG. 1) which is driven by the voltage $U_M$ is switched-in via the contact $c_1$. The conveying pump P should operate in such a fashion that fluid medium is sucked into the glass tube 3. At the same time, a voltage U is applied to the electrodes 12 and 14 of FIG. 1. During this period of time no fluid medium is within the glass tube 3 between the levels A and B. Connected in series with the photoelectric cells 44 and 45 are the respective amplifiers 441 and 451 and the pulse shapers 442 and 452, respectively. The output signal for both pulse shapers is designated by reference character E.

As soon as the fluid medium has reached the level A within the glass tube 3, the output signal F appears at the pulse shaper 442. Consequently, at the output of the AND-gate $A_3$, there is fulfilled he counting condition Z, since the inverter Y likewise inverts the output signal E of the pulse shaper 452 into the output signal F. The relay $K_1$ is now locked into its work position likewise via the AND-gate $A_1$ and the OR-gate $0_1$. A time-delay mechanism ZV, which is likewise electrically coupled with the AND-gate $A_1$ prevents the occurrence of undesired disturbances upon switching-in the light sources or lamps 46, 47.

If the fluid medium passes through the upper level B, then, the relay $K_2$ is switched via the AND-gate $A_2$ and the OR-gate $0_2$ and assumes a self-holding condition via the contact $a_1$, $b_2$ and the OR-gate $0_2$. At the same time, the motor voltage $U_M$ and the electrode voltage U are reversed in polarity at the contacts $c_2$ and $d_2$ and $e_2$ and $f_2$. The direction of delivery of the pump P is reversed. The current path $a_1$, $a_2$, $0_1$ is interrupted at the contact $a_1$. Furthermore, the counting condition Z at the output of the AND-gate $A_3$ is no longer fulfilled. The pulse counter mechanism 42 is switched-off.

Once the fluid medium has dropped beneath the level A, then the AND-gate $A_1$ blocks and therefore also the OR-gate $0_1$. The relay $K_1$ returns into the illustrated rest position. In consequence thereof, the relay $K_2$ likewise returns back into the illustrated rest position, because the current path $a_1$, $b_2$, $0_2$ is interrupted. The system has again assumed the stationary starting condition. The invention also contemplates that the particle counting apparatus automatically performs a predetermined number of counting periods.

Figure 4:
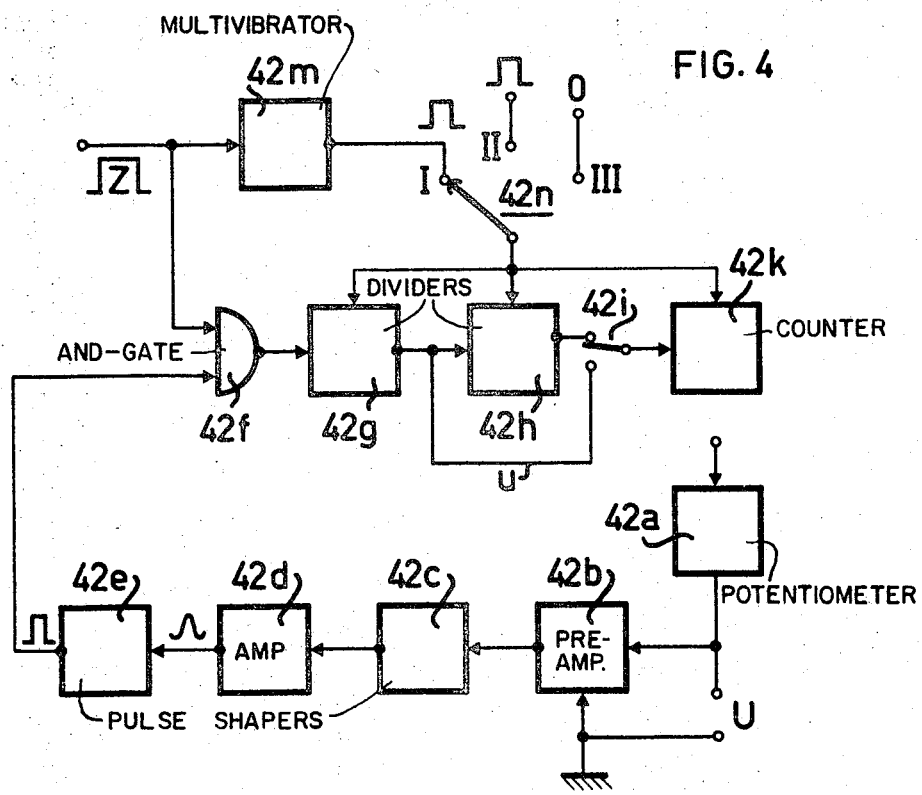
FIG. 4 is a block diagram of the electronic circuitry for the counting circuit used in the particle counting apparatus of FIG. 1.

FIG. 4 schematically illustrates an embodiment of the circuitry for the pulse counter mechanism 42 of FIG. 1. It will be observed that the electrode potential U can be regulated by means of the potentiometer 42a. The voltage changes or current changes produced during the flow of particles through the measuring path 00 (FIG. 1) are amplified in the preamplifier 42b, attenuated or reduced in the attenuator 42c, and again amplified in the amplifier 42d. The thus obtained signal is standardized, for instance in the form of a square wave pulse at the adjustable amplitude discriminator and pulse shaper 42e. The amplitude discriminator and pulse shaper 42e can be constructed such that additionally, during a predetermined number of successive counting periods, pulses in different predetermined amplitude ranges will automatically be recorded. This renders possible a completely automated determination of the size distribution of the particles. The standardized pulses which are to be counted are delivered to the AND-gate 42f. As soon as the control mechanism 41 (FIG. 1) delivers the counting command in the form of the counting condition Z, the AND-gate 42f for the standardized pulses which are to be counted becomes conductive. From a first scaler or divider 42g, the pulses which have been stepped down for instance 100 times arrive via the second scaler or divider 42h and the shunt path u to the switch 42i. From this switch 42i, the counting pulses which, for instance, have now been stepped down 1:100 and 1:1000 can be selectively delivered to the counter unit 42k. The counter unit 42k can be provided with connections for a printing unit by means of which the counting results can be recorded.

At the start of each counting period or interval, it is possible to deliver an extinguishing signal, for instance, from a monostable multivibrator 42m via the terminal or connection I of the switch 42n to the dividers 42g, 42h and the counter unit 42k. In the position III of the switch 42n, the counting results of a number of counting periods can be added up. The switch position III can, for instance, only be attained via the counter position II at which there is continuously present an extinguishing signal. With this arrangement, it is possible to prevent summation errors.

It should be apparent from the foregoing detailed description that the objects set forth at the outset of this specification have now been successfully achieved.

We claim:

1. A counting system for counting particles suspended in a fluid medium, said system comprising:

electrode means for sensing the presence of particles in the fluid medium and producing electrical signals representative thereof;

a measuring tube for receiving said fluid medium, the particles of which are to be counted, said measuring tube being formed of a light-transmitting material;

conveying means for conveying the fluid medium past said electrode means into said measuring tube;

a first and a second fluid level sensing means disposed at said measuring tube in spaced relationship from one another;

counter means coupled with said first and second sensing means and said electrode means for counting said electrical signals, said counter means being turned-on by said first sensing means when the fluid medium reaches a first level in said measuring tube and being turned off by said second sensing means when the fluid medium reaches a second level in said measuring tube;

each said fluid level sensing means comprising a photocell and light source; and means for mounting each respective photocell and light source at a predetermined angle from one another along the outside of aid measuring tube such that light from a given one of said light sources will impinge upon the respective associated photocell substantially only when said measuring tube is devoid of fluid at the level of said respective photocell and light source and therefore being totally reflected at an inner glass-air boundary layer of said measuring tube.

2. A counting system as defined in claim 1, further including reversing switch means for said conveying means to effect drainage of the fluid medium, said reversing switch means being coupled with said counter means and being actuated when said counter means is turned off.

3. A system for counting particles suspended in a fluid medium, said system comprising:

a light-transmitting measuring tube for receiving the fluid medium, the particles of which are to be counted;

a measuring head supported at one end of said measuring tube, said measuring head embodying electrode support means mounted at said one end of said measuring tube and a measuring path member possessing means for providing at least one predetermined electrical resistance measuring path defining at least one throughflow passageway for the fluid medium from one side to the opposite side thereof;

electrode means supported by said electrode support means for sensing the presence of particles in said fluid means as it moves through said throughflow passageway of said electrical resistance measuring path and for producing electrical signals representative of the presence of said particles, said electrode means comprising a pair of electrodes mounted at said electrode support means for cooperation with opposite sides of said through-flow passageway;

conveying means for conveying said fluid medium through said throughflow passageway of said electrical resistance measuring path and past said electrode means into said measuring tube;

a first and a second fluid level sensing means disposed at said measuring tube in spaced relationship from one another;

counter means coupled with said first and second sensing means and said electrode means for counting said electrical signals, said counter means being turned-on by said first sensing means when the fluid medium reaches a fist level in said measuring tube and being turned off by said second sensing means when the fluid medium reaches a second level in said measuring tube;

each said fluid level sensing means comprising a photocell and light source; and means for mounting each respective photocell and light source at a predetermined angle from one another along the outside of said measuring tube such that light from a given one of said light sources will impinge upon the respective associated photocell substantially only when said measuring tube is devoid of fluid at the level of said respective photocell and light source and therefore being totally reflected at an inner glass-air boundary layer of said measuring tube.

4. The system as defined in claim 3, further including a switching device responsive to signals transmitted by said second fluid level sensing means for reversing the conveying direction of the fluid medium by said conveying means.